US008526903B2

(12) United States Patent
Gudem et al.

(10) Patent No.: US 8,526,903 B2
(45) Date of Patent: Sep. 3, 2013

(54) HIGH-LINEARITY RECEIVER WITH TRANSMIT LEAKAGE CANCELLATION

(75) Inventors: Prasad S Gudem, San Diego, CA (US); Li-Chung Chang, Irvine, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 961 days.

(21) Appl. No.: 12/046,387

(22) Filed: Mar. 11, 2008

(65) Prior Publication Data

US 2009/0233568 A1    Sep. 17, 2009

(51) Int. Cl.
*H04B 1/10* (2006.01)
(52) U.S. Cl.
USPC .............................. 455/310; 455/296; 455/307
(58) Field of Classification Search
USPC ................... 455/63.1, 78, 79, 80, 81, 82, 83, 455/296–307, 310, 334
See application file for complete search history.

(56) References Cited

U.S. PATENT DOCUMENTS

| | | | | |
|---|---|---|---|---|
| 3,113,269 | A * | 12/1963 | Essam | 370/277 |
| 3,699,444 | A * | 10/1972 | Ghose et al. | 455/79 |
| 4,660,042 | A * | 4/1987 | Ekstrom | 342/175 |
| 5,001,441 | A | 3/1991 | Gen-Kuong | |
| 5,444,864 | A * | 8/1995 | Smith | 455/84 |
| 6,567,648 | B1 * | 5/2003 | Ahn et al. | 455/83 |
| 6,567,649 | B2 * | 5/2003 | Souissi | 455/83 |
| 6,745,018 | B1 * | 6/2004 | Zehavi et al. | 455/296 |
| 7,206,557 | B2 * | 4/2007 | Aytur et al. | 455/118 |
| 7,689,170 | B2 * | 3/2010 | Kwon et al. | 455/63.1 |
| 7,702,049 | B2 * | 4/2010 | Tsui et al. | 375/347 |
| 7,711,329 | B2 * | 5/2010 | Aparin et al. | 455/83 |
| 7,756,480 | B2 * | 7/2010 | Loh | 455/63.1 |
| 7,848,711 | B2 * | 12/2010 | Asai et al. | 455/78 |
| 2006/0098765 | A1 | 5/2006 | Thomas et al. | |
| 2007/0015468 | A1 * | 1/2007 | Kouki et al. | 455/63.1 |
| 2008/0009258 | A1 | 1/2008 | Safarian et al. | |
| 2008/0143580 | A1 * | 6/2008 | Glazko et al. | 342/17 |
| 2010/0048146 | A1 * | 2/2010 | McCallister | 455/78 |

FOREIGN PATENT DOCUMENTS

| | | |
|---|---|---|
| CN | 101076951 A | 11/2007 |
| JP | 63502133 A | 8/1988 |
| WO | 8703757 A1 | 6/1987 |
| WO | WO2006068635 | 6/2006 |
| WO | WO2008118898 | 10/2008 |

OTHER PUBLICATIONS

International Search Report and Written Opinion—PCT/US2009/036849, International Search Authority—European Patent Office—Jun. 12, 2009.
Taiwan Search Report—TW098107887—TIPO—Jun. 25, 2012.

* cited by examiner

*Primary Examiner* — Blane J Jackson
(74) *Attorney, Agent, or Firm* — Ramin Mobarhan

(57) ABSTRACT

Techniques for performing transmit (TX) leakage cancellation are described. A receiver includes a low noise amplifier (LNA) and a TX leakage canceller. The LNA amplifies a receiver input signal and provides an amplified signal. The TX leakage canceller includes a downconverter, a notch filter, and an upconverter. The downconverter downconverts a canceller input signal (e.g., obtained from the LNA output) with a first LO signal at a transmit frequency and provides a downconverted signal. The notch filter filters the downconverted signal to pass an undesired signal (e.g., a TX leakage signal) and attenuate a jammer and a desired signal in the canceller input signal. The upconverter upconverts the filtered signal with a second LO signal at the transmit frequency and provides a feedback signal. The feedback signal is subtracted at the input or output of the LNA to cancel the undesired signal.

31 Claims, 10 Drawing Sheets

HIGH-LINEARITY RECEIVER WITH TRANSMIT LEAKAGE CANCELLATION

BACKGROUND

I. Field

The present disclosure relates generally to electronics, and more specifically to a receiver for a wireless communication system.

II. Background

A wireless device in a wireless full-duplex communication system can simultaneously transmit and receive data for two-way communication. In the transmit path, a transmitter within the wireless device may modulate a local oscillator (LO) signal with data to obtain a modulated signal and may amplify this modulated signal to obtain a transmit signal having the proper signal level. The transmit signal may be routed through a duplexer and transmitted via an antenna to a base station. In the receive path, a receiver within the wireless device may obtain a received signal via the antenna and the duplexer. The receiver may amplify, filter, and downconvert the received signal to obtain baseband signals, which may be further processed to recover data transmitted by the base station.

For a full-duplex wireless device, the circuitry within the receiver may observe interference from the transmitter. For example, a portion of the transmit signal may leak from the duplexer to the receiver, and the leaked signal (which is commonly referred to as a transmit (TX) leakage signal) may cause interference to a desired signal within the received signal. Since the transmit signal and the desired signal typically reside in two different frequency bands, the TX leakage signal can normally be filtered and typically does not pose a problem in itself. However, the TX leakage signal may interact with a jammer to generate cross modulation distortion components on both sides of the jammer. A jammer is a large amplitude undesired signal that is close in frequency to a desired signal. Some distortion components from the interaction between the TX leakage signal and the jammer may fall within the signal band of the desired signal and would not be filtered out. These distortion components would act as additional noise that may degrade performance. Furthermore, the TX leakage signal may go through a downconverter in the receiver and cause second-order distortion, which is proportional to the square of the TX leakage signal power.

There is therefore a need in the art for techniques to mitigate the deleterious effects of a TX leakage signal in a wireless device.

DETAILED DESCRIPTION

The word "exemplary" is used herein to mean "serving as an example, instance, or illustration." Any design described herein as "exemplary" is not necessarily to be construed as preferred or advantageous over other designs.

A receiver with TX leakage cancellation described herein may be used for various wireless full-duplex communication systems. For example, the receiver may be used for Code Division Multiple Access (CDMA) systems, Time Division Multiple Access (TDMA) systems, Frequency Division Multiple Access (FDMA) systems, Orthogonal FDMA (OFDMA) systems, etc. A CDMA system may implement a radio technology such as Universal Terrestrial Radio Access (UTRA), cdma2000, etc. UTRA includes Wideband CDMA (W-CDMA) and other variants of CDMA. cdma2000 covers IS-2000 (commonly known as "1x"), IS-95, and IS-856 (commonly known as "1xEV-DO"). These various radio technologies and standards are known in the art.

Figure 1:
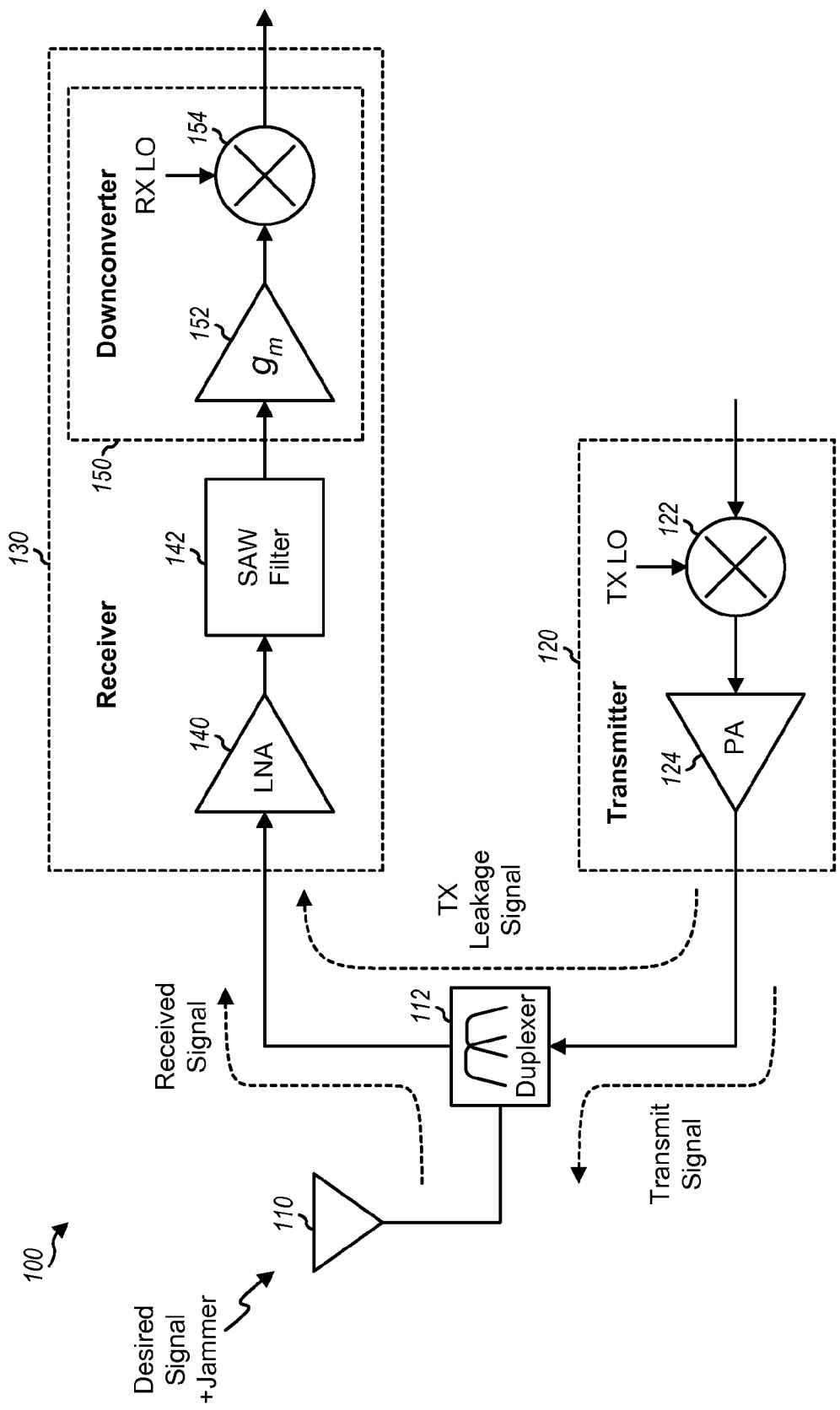
FIG. 1 shows a block diagram of a portion of a wireless device.

FIG. 1 shows a block diagram of a portion of a wireless device 100. Within a transmitter 120, an upconverter 122 receives and frequency upconverts an output signal with a transmit LO (TX LO) signal and provides a modulated signal. A power amplifier (PA) 124 amplifies the modulated signal and provides a transmit signal, which is routed through a duplexer 112 and transmitted via an antenna 110 to one or more base stations. A portion of the transmit signal couples or leaks through duplexer 112 to a receiver 130. The amount of TX leakage is dependent on the amount of isolation between the transmit and receive ports of duplexer 112. The amount of isolation may be dependent on the type of duplexer, the frequency band, etc. A lower TX-RX isolation corresponds to higher level of TX leakage.

A received signal containing a desired signal and possibly a jammer is received via antenna 110, routed through duplexer 112, and provided to receiver 130. Within receiver 130, a low noise amplifier (LNA) 140 receives a receiver input signal containing the received signal from antenna 110 as well as the TX leakage signal from transmitter 120. LNA 140 amplifies the receiver input signal and provides an amplified signal. A surface acoustic wave (SAW) filter 142 filters the amplified signal to remove out of band signal components (e.g., the TX leakage signal) and provides a filtered signal. A downconverter 150 frequency downconverts the filtered signal. Within downconverter 150, a transconductance amplifier 152 amplifies the filtered signal from SAW filter 142. A mixer 154 frequency downconverts the signal from amplifier 152 with a receive LO (RX LO) signal and provides a downconverted signal.

Figure 2A:
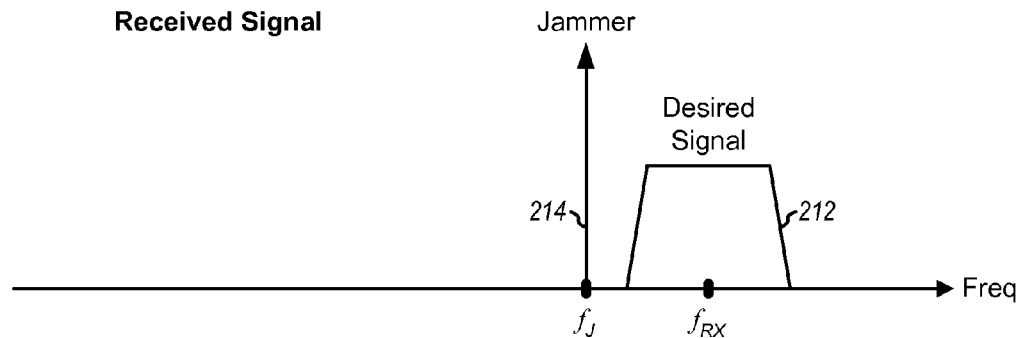
FIGS. 2A, 2B and 2C show a received signal, a downconverter input signal, and a downconverter output signal, respectively.

FIG. 2A shows the received signal, which includes a desired signal 212 and a jammer 214. Jammer 214 is an undesired signal and may correspond to, for example, a signal transmitted by a nearby base station in an Advanced Mobile Phone Service (AMPS) system. The jammer may have an amplitude that is much higher than that of the desired signal and may be located close in frequency to the desired signal. The desired signal is centered at a receive frequency of $f_{RX}$, which is dependent on the frequency channel and band being received. The jammer is centered at a frequency of $f_J$, which may be below the receive frequency (as shown in FIG. 2A) or above the receive frequency (not shown in FIG. 2A).

Figure 2B:
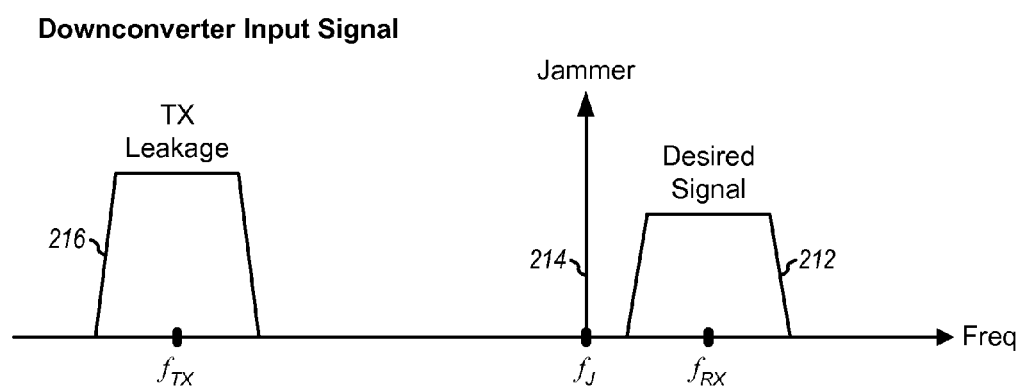

FIG. 2B shows the signal at the input of downconverter 150 in FIG. 1. The downconverter input signal contains desired signal 212 and jammer 214 in the received signal as well as a TX leakage signal 216 from transmitter 120. The TX leakage signal may have a large amplitude relative to the desired signal because the transmit signal may be much larger in amplitude than the desired signal. The TX leakage signal is centered at a transmit frequency of $f_{TX}$. FIG. 2B assumes that LNA 140 has sufficiently high linearity and that distortion components generated by non-linearity of LNA 140 are sufficiently low. High linearity may be achieved for LNA 140 by using techniques such as modified derivative superposition (MDS) or post distortion cancellation (PDC), which are known by those skilled in the art.

Figure 2C:
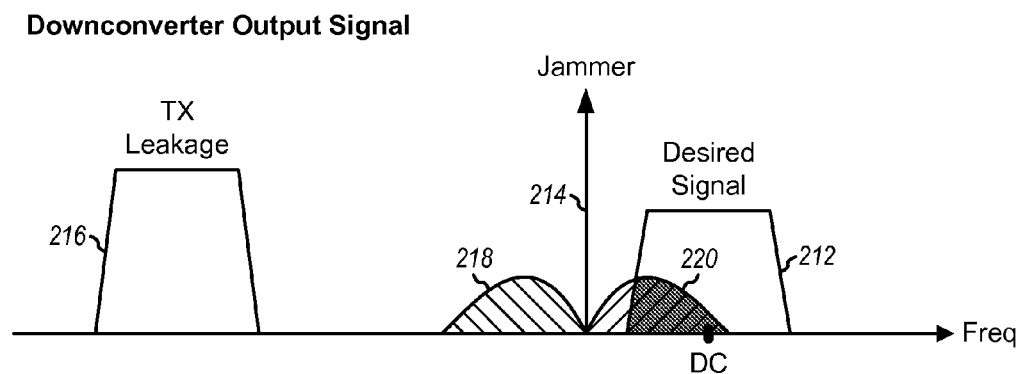

FIG. 2C shows the signal at the output of downconverter 150. The desired signal may be downconverted to DC with direct downconversion (as shown in FIG. 2C) or to an intermediate frequency (IF) with super-heterodyne downconversion (not shown in FIG. 2C). Non-linearity of amplifier 152 and/or mixer 154 in FIG. 1 can cause the modulation on TX leakage signal 216 to be transferred to narrowband jammer 214, which then results in a widened spectrum 218 around the jammer. This spectral widening is referred to as cross modulation. As shown in FIG. 2C, a portion 220 of widened spectrum 218 falls within the desired signal band. Portion 220 (which is shown with shading) acts as additional noise that degrades the performance of the wireless device. This noise further degrades the receiver sensitivity so that the smallest desired signal that can be reliably detected by the receiver would need to have larger amplitude.

SAW filter 142 may be used to filter or attenuate the TX leakage signal and mitigate its deleterious effects. The use of a SAW filter for TX leakage rejection may be undesirable for several reasons. First, the SAW filter is normally a discrete component that is not fabricated on a radio frequency integrated circuit (RFIC) and thus occupies space on a circuit board. Second, the SAW filter typically requires other discrete components for input and output impedance matching. Third, the SAW filter and its impedance matching circuitry increase the cost and size of the wireless device.

In an aspect, the TX leakage signal may be canceled within the receiver in order to relax the linearity requirements of the downconverter. The TX leakage cancellation may be performed in various manners and at various locations within the receiver, as described below.

Figure 3A:
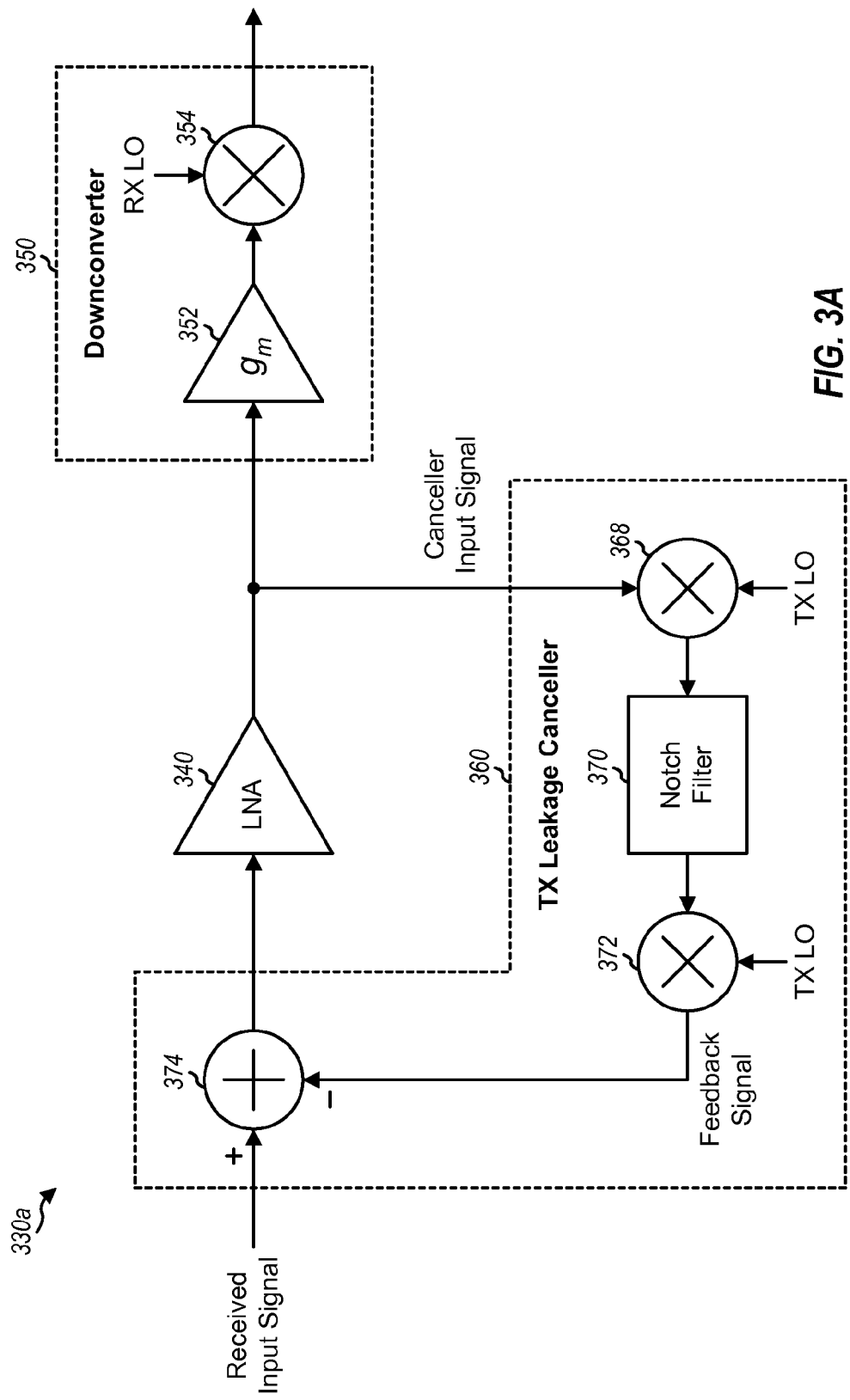
FIGS. 3A and 3B show two exemplary designs of a receiver with TX leakage cancellation.

FIG. 3A shows a block diagram of an exemplary design of a receiver 330a with TX leakage cancellation. Receiver 330a includes an LNA 340, a downconverter 350, and a TX leakage canceller 360. Downconverter 350 is coupled to the output of LNA 340 and includes a transconductance amplifier 352 and a mixer 354. LNA 340 and downconverter 350 operate as described in FIG. 1.

In the exemplary design shown in FIG. 3A, TX leakage canceller 360 senses the TX leakage signal at the output of LNA 340 and cancels the TX leakage signal at the input of LNA 340. TX leakage canceller 360 receives a canceller input signal, which may be an attenuated version of the signal at the output of LNA 340.

Within TX leakage canceller 360, a downconverter 368 downconverts the canceller input signal with the TX LO signal and provides a downconverted signal having the TX leakage signal centered at direct current (DC). A notch filter 370 filters the downconverted signal to pass the TX leakage signal and to attenuate the desired signal, the jammer, and cross modulation distortion components. Notch filter 370 may be designed to have good phase margin in order to avoid instability in the TX leakage cancellation feedback loop. An upconverter 372 upconverts the filtered signal from notch filter 370 with the TX LO signal and provides a feedback signal having the TX leakage signal centered at the transmit frequency. A summer 374 subtracts the feedback signal from the receiver input signal and provides an LNA input signal to LNA 340. Summer 374 may be a summing node that sums two current signals.

In another exemplary design, summer 374 is placed between the output of LNA 340 and the input of amplifier 352, and TX leakage canceller 360 receives the canceller input signal from summer 374. In this exemplary design, the TX leakage cancellation may be performed at the output of LNA 340.

Figure 3B:
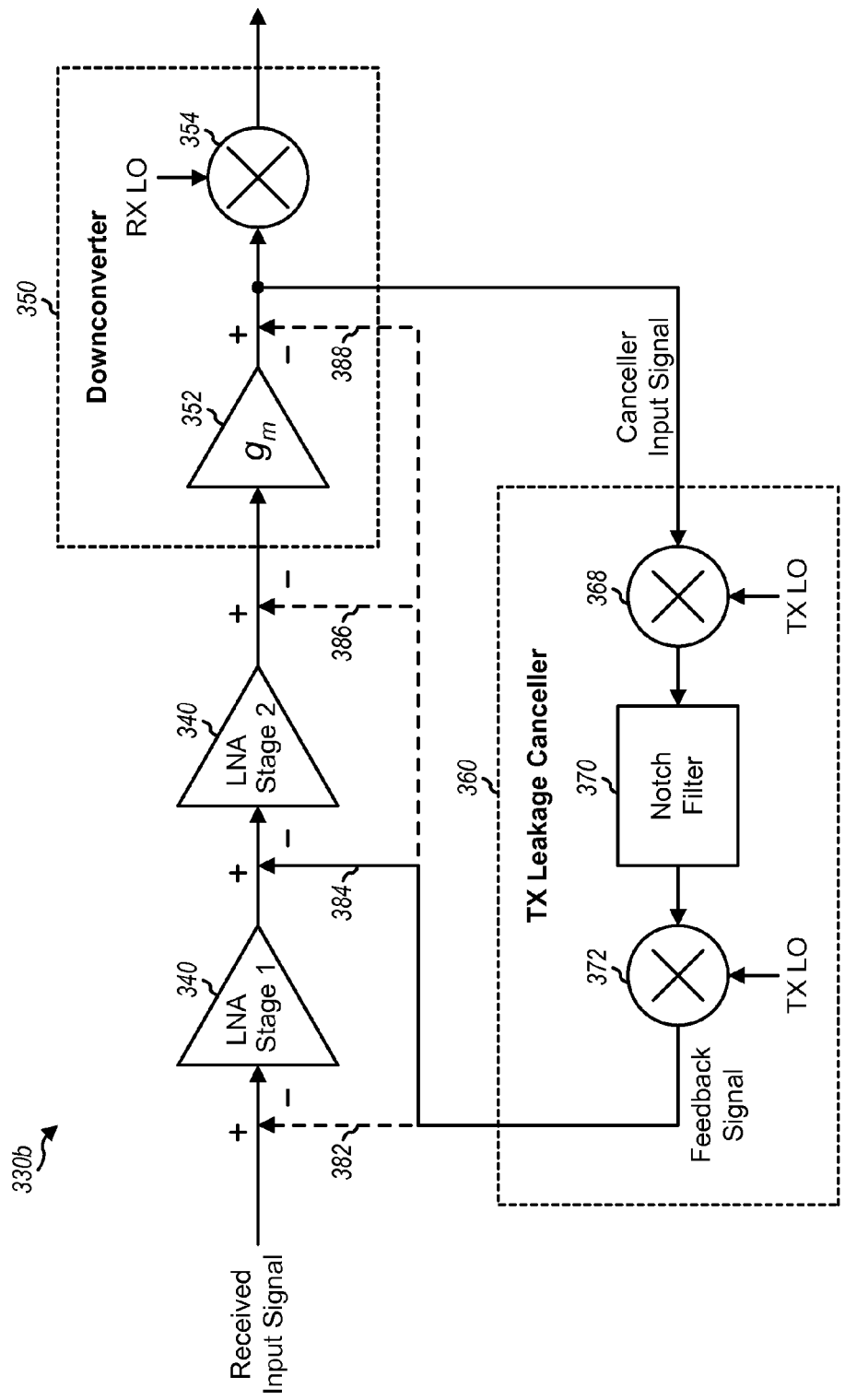

FIG. 3B shows a block diagram of an exemplary design of a receiver 330b with TX leakage cancellation. Receiver 330b includes a first LNA stage 338, a second LNA stage 340, downconverter 350, and TX leakage canceller 360. First LNA stage 338, second LNA stage 340, and downconverter 350 are coupled in series, as shown in FIG. 3B. First LNA stage 338 allows for a tradeoff between noise figure and linearity. A higher gain for first LNA stage 338 may improve noise figure but may degrade linearity, and the converse may be true for a lower gain.

In the exemplary design shown in FIG. 3B, TX leakage canceller 360 senses the TX leakage signal at the output of transconductance amplifier 352 and cancels the TX leakage signal at one or more points in the receiver path. TX leakage canceller 360 includes downconvert 368, notch filter 370, and upconvert 372 that operate as described above for FIG. 3A. TX leakage canceller 360 generates a feedback signal having the TX leakage signal centered at the transmit frequency. In one exemplary design, the feedback signal is provided via a line 382 and subtracted from the receiver input signal at the input of first LNA stage 338. In another exemplary design, the feedback signal is provided via a line 384 and subtracted at the input of second LNA stage 340, as shown in FIG. 3B. In yet another exemplary design, the feedback signal is provided via a line 386 and subtracted at the input of downconverter 350. In yet another exemplary design, the feedback signal is provided via a line 388 and subtracted at the output of amplifier 352.

In general, the TX leakage signal may be sensed at any point prior to mixer 354 in the receiver, e.g., at the output of amplifier 352 (as shown in FIG. 3B), at the output of second LNA stage 340, or at the output of first LNA stage 338. The feedback signal containing the TX leakage signal may be subtracted from any point at or prior to the point at which the TX leakage signal is sensed. If the TX leakage signal is sensed at the output of amplifier 352 (as shown in FIG. 3B), then the feedback signal may be subtracted at the input of first LNA stage 338, the input of second LNA stage 340, the input of amplifier 352, or the output of amplifier 352. If the TX leakage signal is sensed at the output of second LNA stage 340 (not shown in FIG. 3B), then the feedback signal may be subtracted at the input of first LNA stage 338, the input of second LNA stage 340, or the output of second LNA stage 340. If the TX leakage signal is sensed at the output of first LNA stage 338 (also not shown in FIG. 3B), then the feedback signal may be subtracted at the input or output of first LNA stage 338.

In general, the canceller input signal may be downconverted with the TX LO signal as shown in FIGS. 3A and 3B, with the RX LO signal, or with an LO signal at some other frequency. Downconversion with the TX LO signal results in the downconverted TX leakage signal being centered at DC, which may simplify the design of notch filter 370. If the TX leakage signal is downconverted to a frequency other than DC, then notch filter 370 may be design to provide a bandpass response to obtain the desired filtering characteristics described below.

Figure 4:
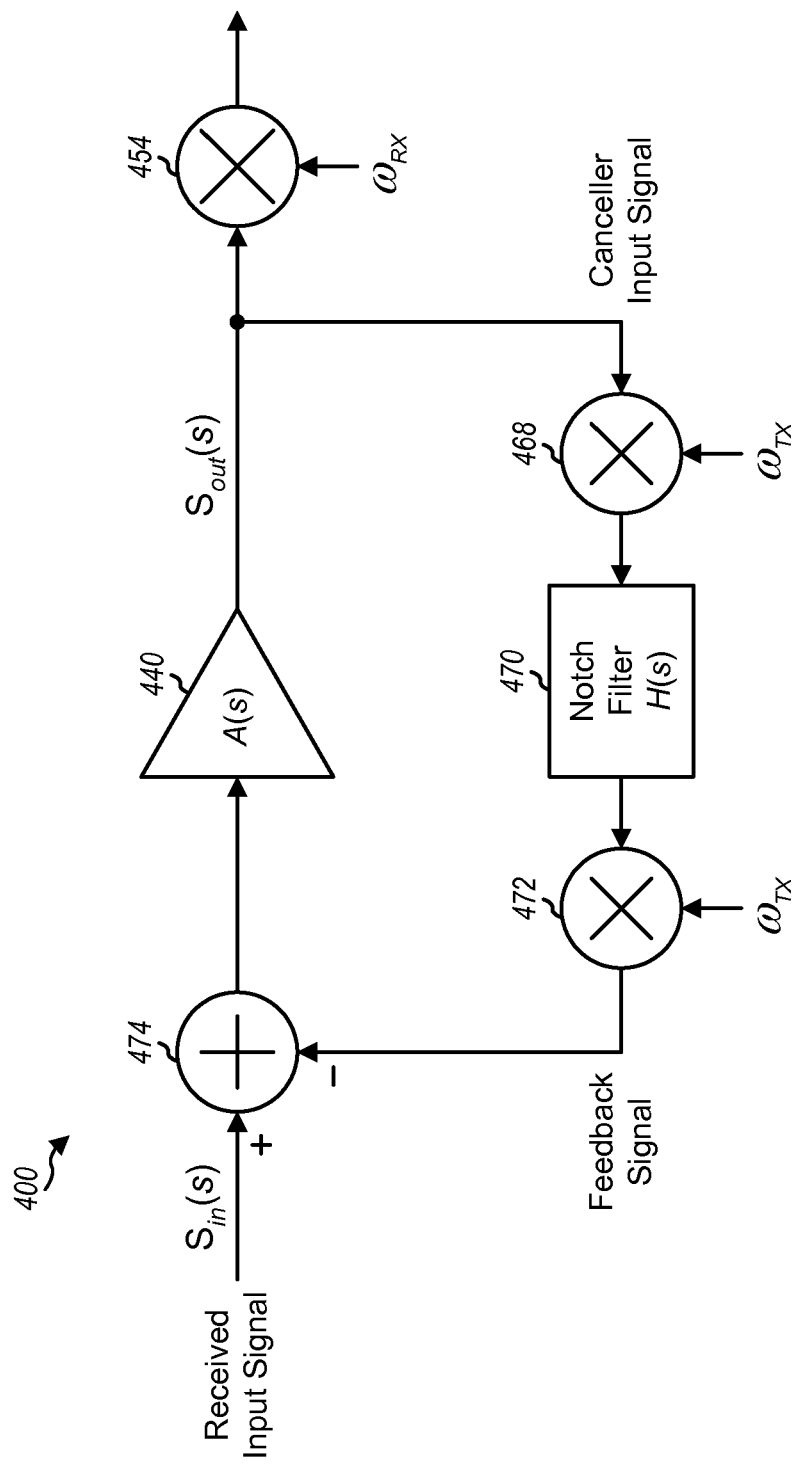
FIG. 4 shows a model of the receiver with TX leakage cancellation.

FIG. 4 shows a block diagram of a model 400 of a receiver with TX leakage cancellation. Model 400 may be used for receiver 330a in FIG. 3A or receiver 330b in FIG. 3B. In model 400, a summer 474 subtracts a feedback signal from a receiver input signal. An amplifier 440 amplifies the output of summer 474 and provides an amplified signal, which is also used as a canceller input signal. Amplifier 440 may include first LNA stage 338, second LNA stage 340, and/or amplifier 352 in FIG. 3B. Amplifier 440 has a frequency response of A(s), where s=jω. In general, frequency may be given in units of Hertz or radians/second, where ω=2π·f, ω is frequency in radians/second, and f is frequency in Hertz. A mixer 454 downconverts the amplified signal with the RX LO signal having a frequency of $\omega_{RX}=2\pi \cdot f_{RX}$. A downconverter 468 downconverts the canceller input signal with the TX LO signal having a frequency of $\omega_{TX}=2\pi \cdot f_{TX}$ and provides a downconverted signal. A filter 470 filters the downconverted signal with a frequency response of H(s) and provides a filtered signal. An upconverter 472 upconverts the filtered signal with the TX LO signal and provides the feedback signal.

The overall transfer function of model 400 may be expressed as:

$$G(\omega_{TX} + \omega_{BB}) = \frac{S_{out}(\omega_{TX} + \omega_{BB})}{S_{in}(\omega_{TX} + \omega_{BB})} = \frac{A(\omega_{TX} + \omega_{BB})}{1 + A(\omega_{TX} + \omega_{BB}) \cdot H(\omega_{BB})}, \quad \text{Eq (1)}$$

where $S_{in}(\omega_{TX}+\omega_{BB})$ is the receiver input signal, $S_{out}(\omega_{TX}+\omega_{BB})$ is the amplified signal from amplifier 440, $A(\omega_{TX}+\omega_{BB})$ is the frequency response of amplifier 440, $H(\omega_{BB})$ is the frequency response of filter 470 and mixers 468 and 472, $G(\omega_{TX}+\omega_{BB})$ is the overall transfer function of model 400, and $\omega_{BB}$ is a frequency offset from the transmit frequency.

The gains and frequency responses of mixers 468 and 472 are typically constant and may thus be absorbed into $H(\omega_{BB})$.

The overall transfer function at the transmit and receive frequencies may be expressed as:

$$G(\omega_{TX}) = \frac{S_{out}(\omega_{TX})}{S_{in}(\omega_{TX})} = \frac{A(\omega_{TX})}{1 + A(\omega_{TX}) \cdot H(0)}, \quad \text{Eq (2)}$$

$$G(\omega_{RX}) = \frac{S_{out}(\omega_{RX})}{S_{in}(\omega_{RX})} = \frac{A(\omega_{RX})}{1 + A(\omega_{RX}) \cdot H(\omega_{RX} - \omega_{TX})}, \quad \text{Eq (3)}$$

where $\omega_{RX}-\omega_{TX}$ is the difference frequency, which is the difference between the receive frequency and the transmit frequency. The TX leakage signal observes the transfer function shown in equation (2). The jammer and the desired signal observe the transfer function shown in equation (3).

The amount of cancellation of the TX leakage signal at the transmit frequency is determined by the denominator of equation (2). The amount of attenuation of the desired signal at the receive frequency is determined by the denominator of equation (3). For example, the desired signal may be attenuated by 1 dB or less by having $[1+A(\omega_{RX}) \cdot H(\omega_{RX}-\omega_{TX})] \leq 1.12$ or equivalently $A(\omega_{RX}) \cdot H(\omega_{RX}-\omega_{TX}) \leq 0.12$, where 0.12 is equal to −18 decibels (dB).

The TX leakage cancellation may be expressed as:

$$TX \text{ leakage cancellation} = \frac{G(\omega_{RX})}{G(\omega_{TX})} \approx A(\omega_{RX}) \cdot H(\omega_{RX} - \omega_{TX}). \quad \text{Eq (4)}$$

As shown in equation (4), the amount of TX leakage cancellation is dependent on the gains of both amplifier 440 and filter 470.

For clarity, a specific exemplary design of filter 470 is described below. In this exemplary design, the target amount of TX leakage cancellation is 26 dB, and the target amount of desired signal attenuation is 1 dB. These two conditions may be expressed as:

$$A(\omega_{TX}) \cdot H(0) \approx 26 \text{ dB, and} \quad \text{Eq (5)}$$

$$A(\omega_{RX}) \cdot H(\omega_{RX}-\omega_{TX}) \approx -18 \text{ dB} \quad \text{Eq (6)}$$

Amplifier 440 may be assumed to be flat across the transmit and receive frequencies, so that $A(\omega_{TX}) \approx A(\omega_{RX})$. Filter 470 may then be designed to achieve the following:

$$\text{Filter attenuation} = \frac{H(0)}{H(\omega_{RX} - \omega_{TX})} \geq 26 \text{ dB} + 18 \text{ dB} = 44 \text{ dB}. \quad \text{Eq (7)}$$

For the exemplary design described above, equation (7) indicates that the filter response at the difference frequency should be attenuated by 44 dB relative to the passband. In general, the target amount of attenuation for filter 470 is dependent on the target amount of TX leakage cancellation and the target amount of desired signal attenuation.

Filter 470 may be implemented with a single first-order filter stage to ensure loop stability, but this filter stage may not provide sufficient attenuation. Filter 470 may be implemented with multiple filter stages to obtain the target attenuation, but these multiple filter stages may introduce too much phase shift and lead to loop instability.

In another aspect, a notch filter is used for filter 470 to provide the target amount of attenuation while ensuring loop stability. The notch filter can provide high attenuation at a notch frequency, which may be placed at or near the difference frequency $\omega_{RX}-\omega_{TX}$. The notch filter also does not introduce excessive phase shift, which may ensure that the loop can be unconditionally stable.

After downconversion of the canceller input signal by downconverter 468, the jammer and the desired signal appear only at positive frequency if the transmit frequency is lower than the receive frequency, as shown in FIG. 2C. In one exemplary design, a complex notch filter is used for filter 470 and has a single zero placed at or near the difference frequency. The complex notch filter can provide high attenuation of the jammer and the desired signal at positive frequency while introducing small phase shift, which may improve loop stability.

Figure 5:
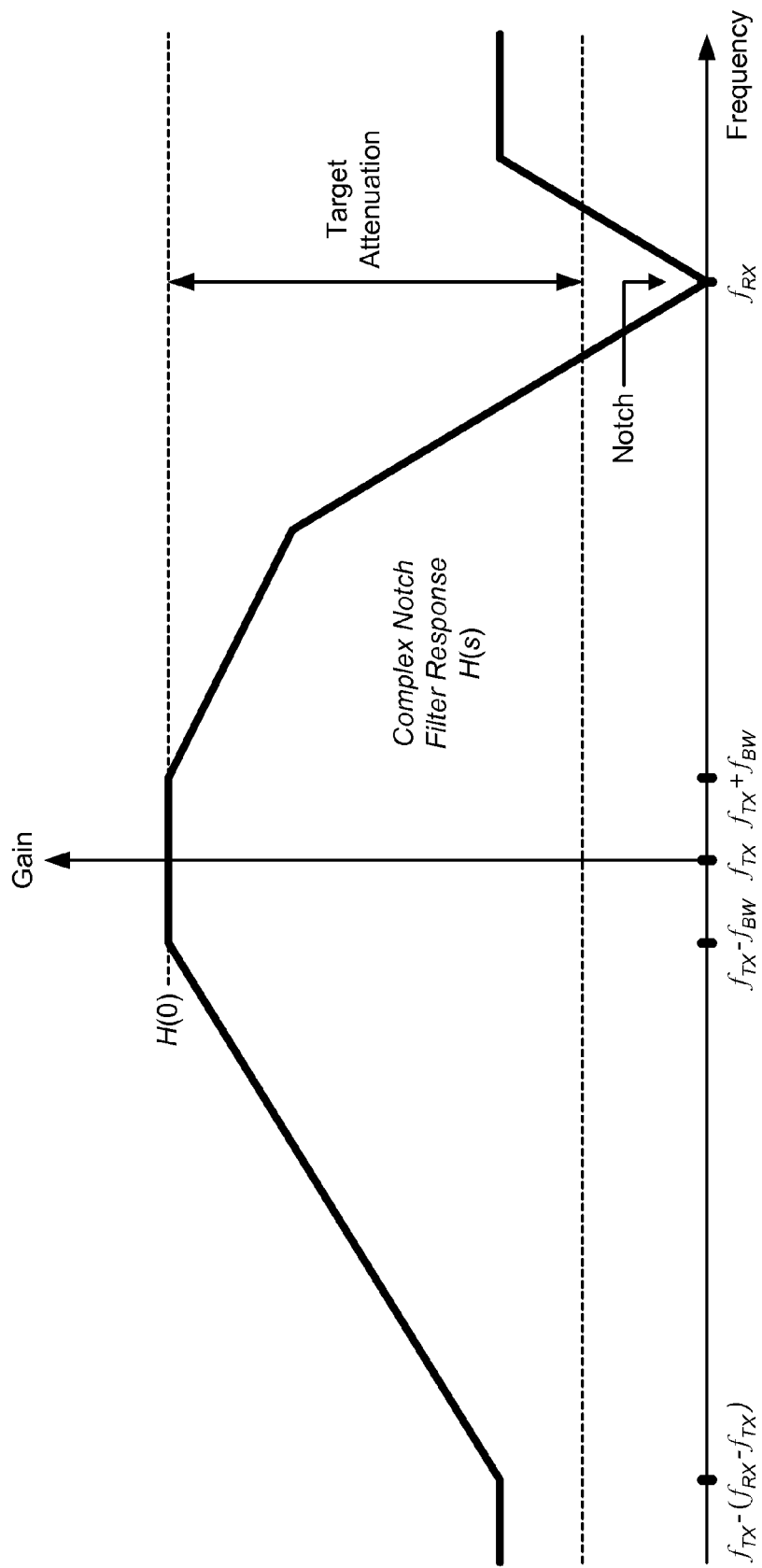
FIG. 5 shows a frequency response of a complex notch filter.

FIG. 5 shows a plot of the frequency response H(s) of a complex notch filter in accordance with one exemplary design. FIG. 5 shows the frequency response at the transmit frequency $f_{TX}$ instead of DC. The complex notch filter has an asymmetric response about the transmit frequency $f_{TX}$, so that the frequency response above $f_{TX}$ is different from the frequency response below $f_{TX}$. The complex notch filter has a passband that is equal to or greater than the bandwidth of the TX leakage signal. For example, the passband may be 800 KHz if the TX leakage signal has a bandwidth of 620 KHz. A single pole is placed at the passband edge and provides a roll-off of 20 dB per decade on both sides of the passband. The passband is from $f_{TX}-f_{BW}$ to $f_{TX}+f_{BW}$, where $f_{BW}$ is the single-side bandwidth of the complex notch filter.

The complex notch filter also has a zero located at the receive frequency $f_{RX}$ and can provide the target amount of attenuation of the jammer and the desired signal. The zero can provide an additional roll-off of 40 dB per decade on top of the roll-off provided by the pole at the passband edge. However, unlike an additional pole that can introduce additional phase shift, the zero preserves the phase margin of 90 degrees normally achieved with the single pole. Thus, the zero can provide more attenuation without affecting loop stability. At frequencies below $f_{TX}$, the complex notch filter has a roll-off provided by the pole at the passband edge. In general, a notch filter may have a single zero or multiple zeros.

The frequency response $H(\omega)$ of the complex notch filter in FIG. 5 may be expressed as:

$$H(\omega) = H(0) \cdot \left[ \frac{1}{1+j\frac{\omega-(\omega_{TX}+\omega_p)}{\omega_p}} - \frac{1}{j\frac{\omega_{RX}-\omega_{TX}}{\omega_p}} \right], \quad \text{Eq (8)}$$

where $\omega_p = 2\pi \cdot f_{BW}$ is the frequency of the pole at the passband edge of the complex notch filter.

The frequency response of the complex notch filter may be approximated as:

$$H(\omega) \approx H(0) \quad \text{for } (\omega_{TX}-\omega_p) < \omega < (\omega_{TX}+\omega_p) \quad \text{Eq (9)}$$

$$\approx 0 \quad \text{for } \omega = \omega_{RX}$$

$$\approx j\frac{\omega_p}{\omega_{RX}-\omega_{TX}} \quad \text{for } \omega < [\omega_{TX}-(\omega_{RX}-\omega_{TX})].$$

Figure 6:
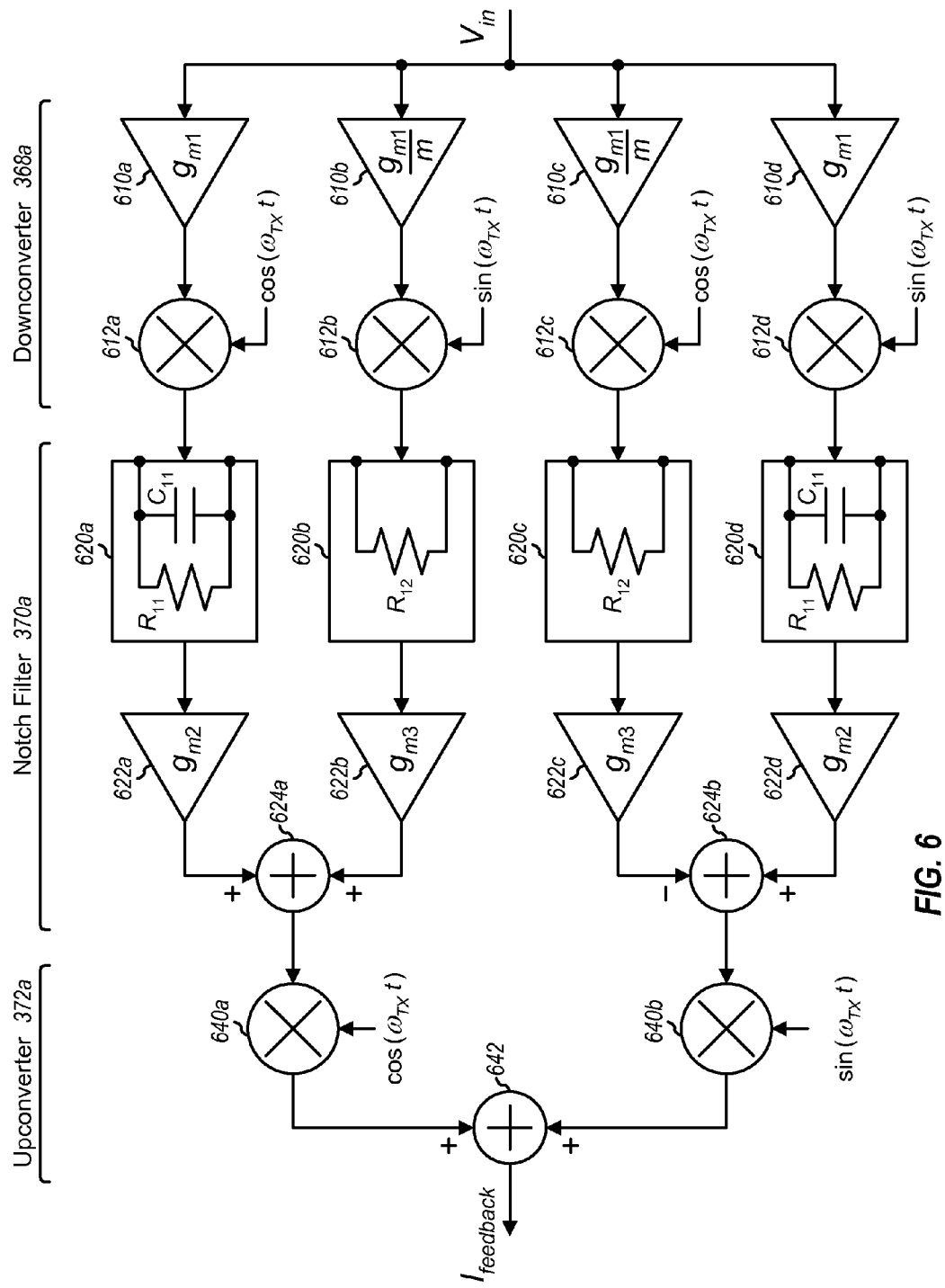
FIGS. 6, 7 and 8 show three designs of a downconverter, a complex notch filter, and an upconverter within a TX leakage canceller.

FIG. 6 shows a block diagram of an exemplary design of a downconverter 368a, a complex notch filter 370a, and an upconverter 372a, which may be used for downconverter 368, notch filter 370, and upconverter 372, respectively, in FIGS. 3A and 3B and also for downconverter 468, notch filter 470, and upconverter 472, respectively, in FIG. 4. In this exemplary design, downconverter 368a receives a voltage canceller input signal $V_{in}$, and upconverter 372a provides a current feedback signal $I_{feedback}$.

Within downconverter 368a, four transconductance amplifiers 610a through 610d receive and amplify the canceller input signal $V_{in}$. Amplifiers 610a and 610d have gains of $g_{m1}$, and amplifiers 610b and 610c have gains of $g_{m1}/m$, where m is a scaling ratio between amplifiers 610a and 610d and amplifiers 610b and 610c. For example, amplifiers 610a and 610d may have a size of 1, amplifiers 610b and 610c may have a size of 1/10, and m would be equal to 10. Four mixers 612a through 612d receive the outputs of amplifiers 610a through 610d, respectively. Mixers 612a and 612c downconvert their input signals with an inphase transmit LO signal, $\cos(\omega_{TX}t)$, and mixers 612b and 612d downconvert their input signals with a quadrature transmit LO signal, $\sin(\omega_{TX}t)$.

Within notch filter 370a, the outputs of mixers 612a and 612d are passed through RC networks 620a and 620d, respectively. The outputs of mixers 612b and 612c are passed through resistive networks 620b and 620c, respectively. Transconductance amplifiers 622a through 622d receive and amplify the outputs of networks 620a through 620d, respectively. Amplifiers 622a and 622d have gains of $g_{m2}$, and amplifiers 622b and 622c have gains of $g_{m3}$. A summer 624a sums the outputs of amplifiers 622a and 622b and provides an inphase filtered signal. A summer 624b subtracts the output of amplifier 622c from the output of amplifier 622d and provides a quadrature filtered signal.

Within upconverter 372a, a mixer 640a upconverts the inphase filtered signal with $\cos(\omega_{TX}t)$. A mixer 640b upconverts the quadrature filtered signal with $\sin(\omega_{TX}t)$. A summer 642 sums the outputs of mixers 640a and 640b and provides the feedback signal $I_{feedback}$.

For the exemplary design shown in FIG. 6, the parameters of the complex notch filter may be expressed as:

$$H(0) = g_{m1} \cdot R_{11} \cdot g_{m2}, \quad \text{Eq (10)}$$

$$\omega_p = \frac{1}{R_{11} \cdot C_{11}}, \text{ and} \quad \text{Eq (11)}$$

$$\omega_{notch} = \frac{g_{m2}}{g_{m3}} \cdot \frac{1}{m \cdot R_{12} \cdot C_{11}}, \quad \text{Eq (12)}$$

where $R_{11}$ is the value of the resistors within RC networks 620a and 620d, $C_{11}$ is the value of the capacitors within RC networks 620a and 620d, $R_{12}$ is the value of the capacitors within resistive networks 620b and 620c, and $\omega_{notch}$ is the notch frequency, which may be set at $\omega_{notch} \approx \omega_{RX} - \omega_{TX}$.

The amplifier gains and the resistor and capacitor values may be selected to obtain the desired transfer functions for the TX leakage signal, the jammer, and the desired signal.

Figure 7:
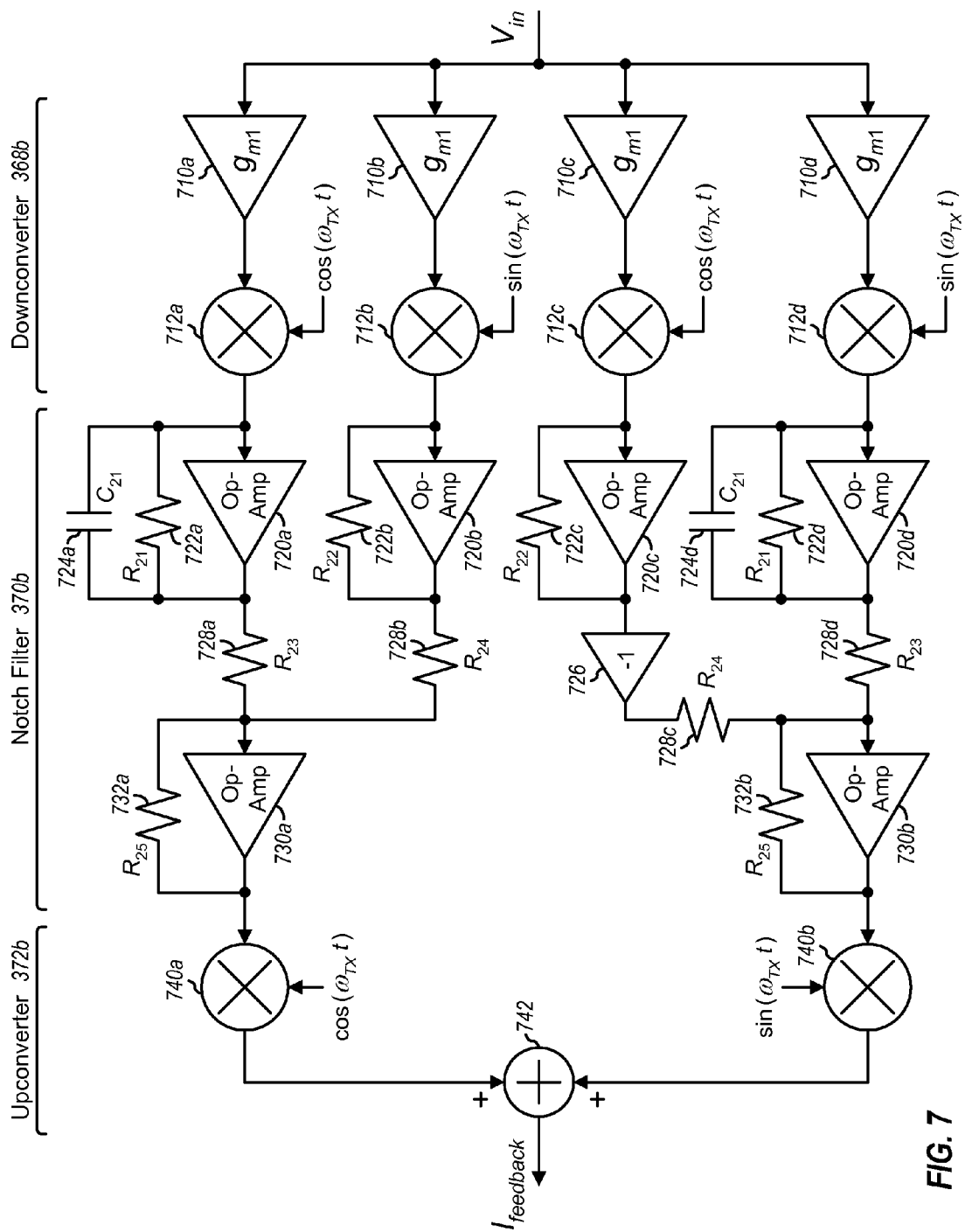

FIG. 7 shows a block diagram of an exemplary design of a downconverter 368b, a complex notch filter 370b, and an upconverter 372b, which may be one implementation of downconverter 368a, notch filter 370a, and upconverter 372a, respectively, in FIG. 6. Within downconverter 368b, four transconductance amplifiers 710a through 710d receive and amplify the canceller input signal $V_{in}$ with gains of $g_{m1}$. Four mixers 712a through 712d receive the outputs of amplifiers 710a through 710d, respectively. Mixers 712a and 712c downconvert their input signals with $\cos(\omega_{TX}t)$, and mixers 712b and 712d downconvert their input signals with $\sin(\omega_{TX}t)$.

Within notch filter 370b, operational amplifiers (op-amps) 720a through 720d receive the outputs of mixers 712a through 712d, respectively. Resistors 722a through 722d are coupled between the input and output of op-amps 720a through 720d, respectively. Capacitors 724a and 724d are coupled between the input and output of op-amps 720a and 720d, respectively. An op-amp 730a has its input coupled to the outputs of op-amps 720a and 720b via resistors 728a and 728b, respectively. A resistor 732a is coupled between the input and output of op-amp 730a. An inverting op-amp 726 is coupled at the output of op-amp 720c. An op-amp 730b has its input coupled to the outputs of op-amps 726 and 720d via resistors 728c and 728d, respectively. A resistor 732b is coupled between the input and output of op-amp 730b.

Within upconverter 372b, a mixer 740a upconverts the inphase filtered signal from op-amp 730a with $\cos(\omega_{TX}t)$. A mixer 740b upconverts the quadrature filtered signal from op-amp 730b with $\sin(\omega_{TX}t)$. A summer 742 sums the outputs of mixers 740a and 740b and provides the feedback signal $I_{feedback}$. The amplifier gains and the resistor and capacitor values may be selected to obtain the desired transfer functions for the TX leakage signal, the jammer, and the desired signal.

For the exemplary design shown in FIG. 7, the parameters of the complex notch filter may be expressed as:

$$H(0) = g_{m1} \cdot R_{21} \cdot \frac{R_{25}}{R_{23}}, \quad \text{Eq (13)}$$

$$\omega_p = \frac{1}{R_{21} \cdot C_{21}}, \text{ and} \quad \text{Eq (14)}$$

$$\omega_{notch} = \frac{R_{24}}{R_{22}} \cdot \frac{1}{R_{23} \cdot C_{21}}, \quad \text{Eq (15)}$$

where $R_{21}$ is the value of resistors 722a and 722d,
$C_{21}$ is the value of capacitors 724a and 724d,
$R_{22}$ is the value of resistors 722b and 722c,
$R_{23}$ is the value of resistors 728a and 728d,
$R_{24}$ is the value of resistors 728b and 728c, and
$R_{25}$ is the value of resistors 732a and 732b.

H(0) in equation (13) has different dimension than H(0) equation (10). A $g_{m2}$ stage may be inserted after each of op-amps 730a and 730b in FIG. 7. Equation (13) would then become $$H(0) = g_{m1} \cdot R_{21} \cdot \frac{R_{25}}{R_{23}} \cdot g_{m2}$$

and would have the same dimension as H(0) equation (10).

Figure 8:
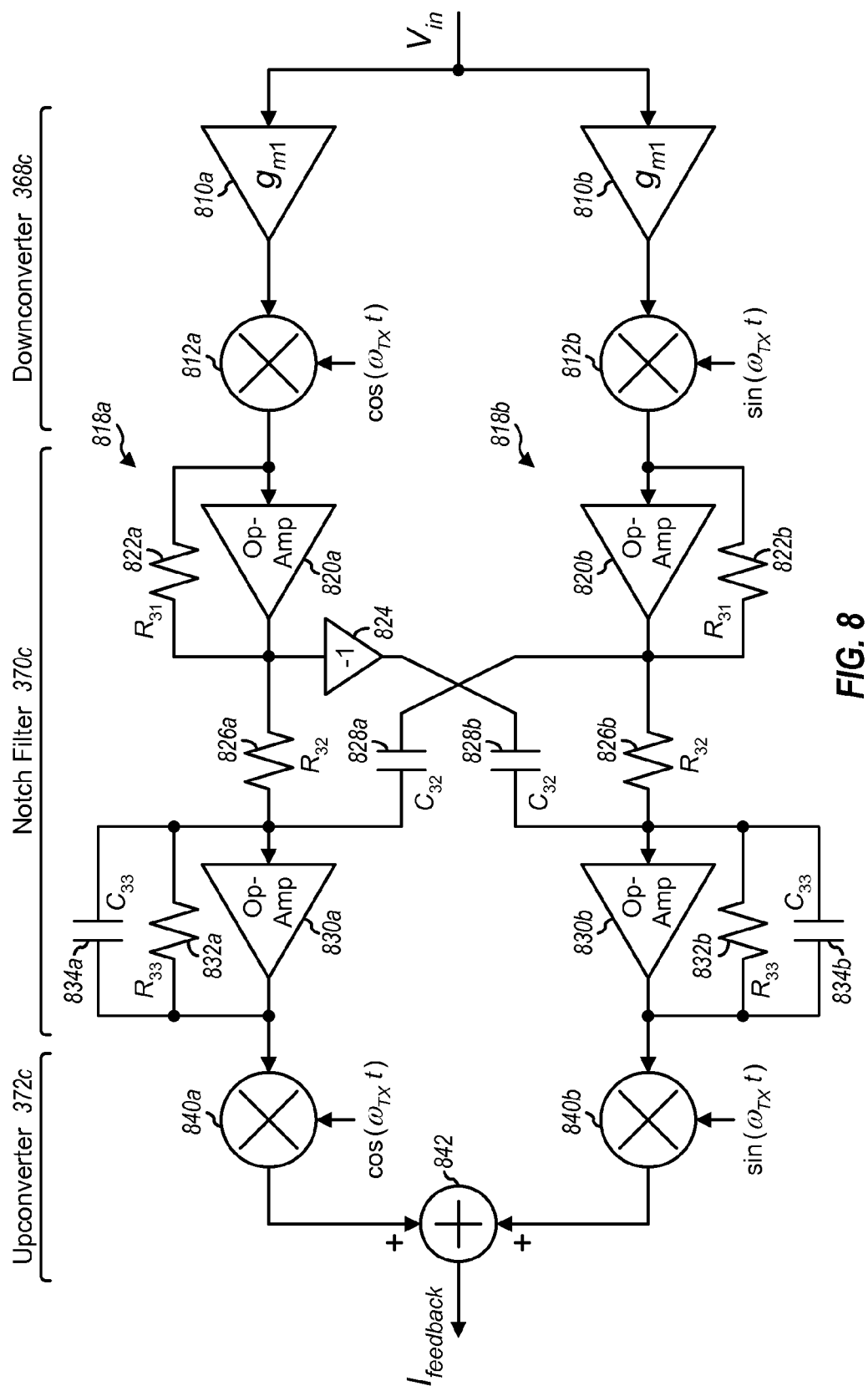

FIG. 8 shows a block diagram of another exemplary design of a downconverter 368c, a complex notch filter 370c, and an upconverter 372c, which may be used for downconverter 368, notch filter 370, and upconverter 372, respectively, in FIGS. 3A and 3B and also for downconverter 468, notch filter 470, and upconverter 472, respectively, in FIG. 4. The exemplary design shown in FIG. 8 provides a low-distortion low-noise complex notch filter.

Within downconverter 368c, two transconductance amplifiers 810a and 810b receive and amplify the canceller input signal $V_{in}$ with gains of $g_{m1}$. A mixer 812a downconverts the output signal from amplifier 810a with $\cos(\omega_{TX}t)$. A mixer 812b downconverts the output signal from amplifier 810b with $\sin(\omega_{TX}t)$.

Within notch filter 370c, two filter sections 818a and 818b perform filtering for the inphase and quadrature paths, respectively. Op-amps 820a and 820b receive the outputs of mixers 812a and 812b, respectively. Resistors 822a and 822b are coupled between the input and output of op-amps 820a and 820b, respectively. An inverting op-amp 824 is coupled at the output of op-amp 820a. Op-amps 830a and 830b have their inputs coupled to the outputs of op-amps 820a and 820b via resistors 826a and 826b, respectively. Op-amps 830a and 830b also have their inputs coupled to the outputs of op-amps 820b and 824 via capacitors 828a and 828b, respectively. A resistor 832a and a capacitor 834a are coupled between the input and output of op-amp 830a. A resistor 832b and a capacitor 834b are coupled between the input and output of op-amp 830b.

Within upconverter 372c, a mixer 840a upconverts the inphase filtered signal from op-amp 830a with $\cos(\omega_{TX}t)$. A mixer 840b upconverts the quadrature filtered signal from op-amp 830b with $\sin(\omega_{TX}t)$. A summer 842 sums the outputs of mixers 840a and 840b and provides the feedback signal $I_{feedback}$. The amplifier gains and the resistor and capacitor values may be selected to obtain the desired transfer functions for the TX leakage signal, the jammer, and the desired signal.

For the exemplary design shown in FIG. 8, the parameters of the complex notch filter may be expressed as:

$$H(0) = g_{m1} \cdot R_{31} \cdot \frac{R_{33}}{R_{32}}, \quad \text{Eq (16)}$$

$$\omega_p = \frac{1}{R_{33} \cdot C_{33}}, \text{ and} \quad \text{Eq (17)}$$

$$\omega_{notch} = \frac{1}{R_{32} \cdot C_{32}}, \quad \text{Eq (18)}$$

where $R_{31}$ is the value of resistors 822a and 822b,
$R_{32}$ is the value of resistors 826a and 826b,
$C_{32}$ is the value of capacitors 828a and 828b,
$R_{33}$ is the value of resistors 832a and 832b, and
$C_{33}$ is the value of capacitors 834a and 834b.

H(0) in equation (16) has different dimension than H(0) equation (10). A $g_{m2}$ stage may be inserted after each of op-amps 830a and 830b in FIG. 8. Equation (16) would then become $$H(0) = g_{m1} \cdot R_{31} \cdot \frac{R_{33}}{R_{32}} \cdot g_{m2}$$

and would have the same dimension as H(0) equation (10).

Several exemplary designs of a complex notch filter have been described above. FIG. 6 shows an exemplary gm-C circuit for the complex notch filter. FIG. 7 shows an exemplary active-RC circuit for the complex notch filter using four downconverters 712a through 712d. FIG. 8 shows an exemplary active-RC circuit for the complex notch filter using only two downconverters 812a and 812b. The complex notch filter may also be implemented with other exemplary designs.

The low-distortion low-noise complex notch filter design shown in FIG. 8 has several advantages. The low-distortion and low-noise characteristics result in less distortion and noise being generated in the feedback path and injected in the forward path, which may improve performance.

In the exemplary complex notch filter design shown in FIG. 5, the transmit frequency is lower than the receive frequency. The jammer and the desired signal are thus at positive frequency after downconversion by downconverter 368 in FIGS. 3A and 3B. In this case, a single notch may be placed at a positive frequency (or above the transmit frequency), as shown in FIG. 5, to attenuate the jammer and the desired signal. If the transmit frequency is higher than the receive frequency, then the jammer and the desired signal would be at negative frequency after downconversion. In this case, a single notch may be placed at a negative frequency to attenuate the jammer and the desired signal.

The exemplary designs described above utilize a complex notch filter to provide large attenuation of the jammer and the desired signal without introducing excessive phase shift in the feedback loop. A regular notch filter with notches at both positive and negative frequencies may also be used for the TX leakage canceller. In one exemplary design, the regular notch filter is implemented with two complex notch filters coupled in cascade. One complex notch filter may have a notch at positive frequency, and the other complex notch filter may have a notch at negative frequency.

In yet another exemplary design, multiple complex notch filters with notches at the same frequency polarity (e.g., positive frequency) may be used to provide even more attenuation of the jammer and the desired signal. The notch frequencies for these complex notch filters may overlap (e.g., at the difference frequency) or may be spaced apart near the difference frequency. For example, one notch frequency may be at the difference frequency, and another notch frequency may be at the jammer frequency.

Figure 9:
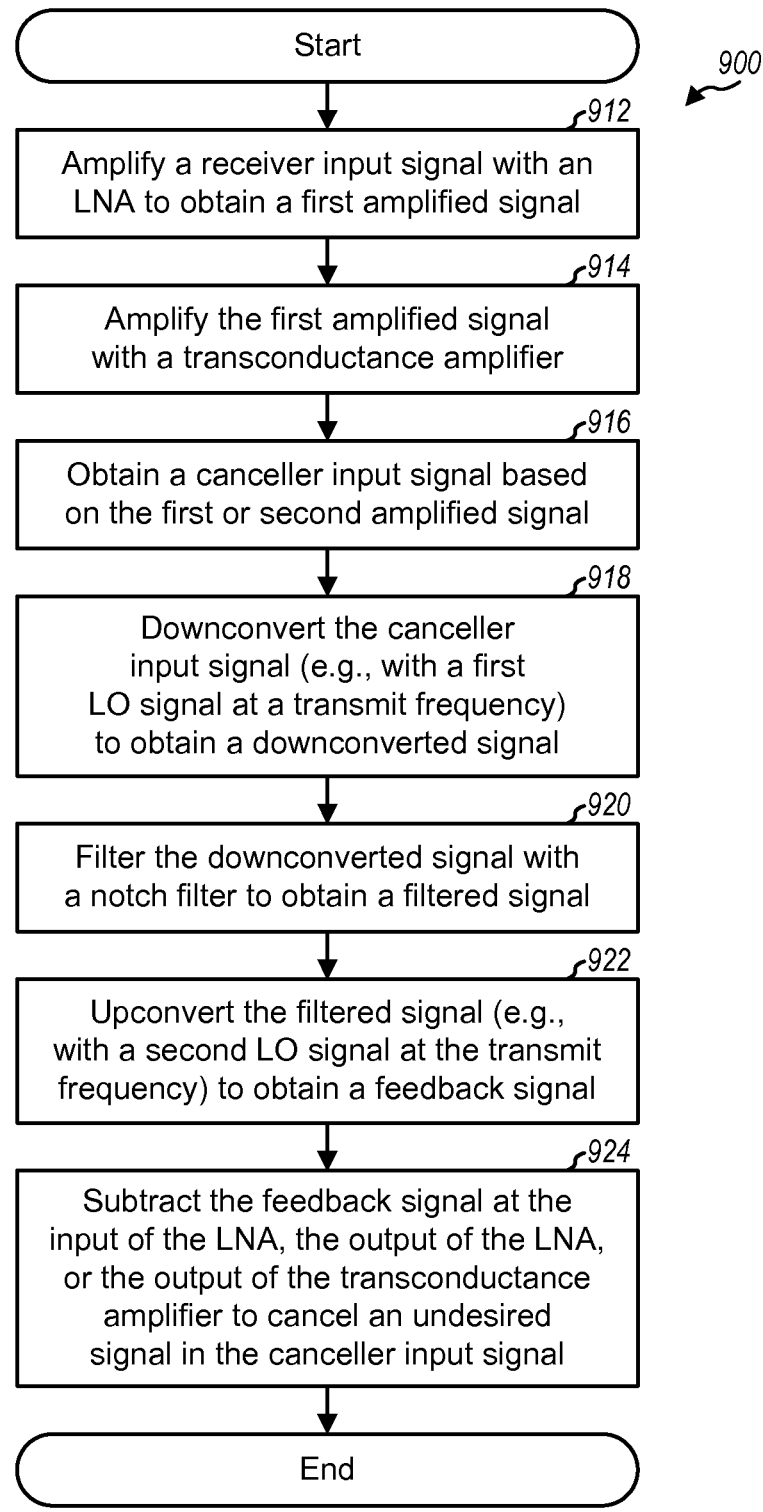
FIG. 9 shows a process for performing TX leakage cancellation.

FIG. 9 shows an exemplary design of a process 900 for performing TX leakage cancellation. A receiver input signal may be amplified with an LNA to obtain a first amplified signal (block 912). The first amplified signal may be further amplified with a transconductance amplifier (block 914). A canceller input signal may be obtained based on the first or second amplified signal (block 916).

The canceller input signal may be downconverted (e.g., with a first LO signal at a transmit frequency) to obtain a downconverted signal (block 918). The downconverted signal may be filtered with a notch filter to obtain a filtered signal (block 920). The filtered signal may be upconverted (e.g., with a second LO signal at the transmit frequency) to obtain a feedback signal used to cancel an undesired signal in the canceller input signal (block 922). The feedback signal may be subtracted at the input of the LNA, the output of the LNA, or the output of the transconductance amplifier (block 924).

In one exemplary design, the canceller input signal may be downconverted by first and second mixers with I and Q LO signals, respectively, at the transmit frequency to obtain I and Q downconverted signals, respectively. The I and Q downconverted signals may be filtered with first and second filter sections, respectively, to obtain I and Q filtered signals, respectively. First and second intermediate signals from the first and second filter sections, respectively, may be capacitively coupled (e.g., with capacitors 828a and 828b in FIG. 8) to the second and first sections, respectively. The I and Q filtered signals may be upconverted by third and fourth mixers with I and Q LO signals, respectively, at the transmit frequency to obtain I and Q upconverted signals, which may be summed to obtain the feedback signal.

The undesired signal may be a TX leakage signal from a transmitter. The notch filter may pass the TX leakage signal and attenuate a jammer and a desired signal in the canceller input signal. The notch filter may have a passband that is equal to or larger than the bandwidth of the undesired signal and may provide a predetermined amount of attenuation of the jammer and the desired signal. The notch filter may be implemented with a gm-C circuit, e.g., as shown in FIG. 6, with an active-RC circuit, e.g., as shown in FIG. 7 or 8, or with some other circuit. The notch filter may be a complex notch filter having a notch only at positive or negative frequency. The notch may be located at the jammer frequency, the difference frequency between the receive frequency and the transmit frequency, or some other frequency.

The TX leakage canceller described herein may be used for various frequency bands. For example, the TX leakage canceller may be used for any of the frequency bands listed in Table 1.

TABLE 1

| Frequency Band | Transmit (Uplink) | Receive (Downlink) | TX-RX Spacing |
|---|---|---|---|
| Cellular | 824-849 MHz | 869-894 MHz | 45 MHz |
| DCS | 1710-1785 MHz | 1805-1880 MHz | 95 MHz |
| PCS | 1850-1910 MHz | 1930-1990 MHz | 80 MHz |
| IMT-2000 | 1920-1980 MHz | 2110-2170 MHz | 190 MHz |

The cellular, Personal Communication System (PCS), Digital Cellular System (DCS), and International Mobile Telecommunications-2000 (IMT-2000) bands are commonly used in the United States. Other frequency bands also used for wireless communication. As shown in Table 1, the difference frequency, which is the spacing between the transmit frequency and the receive frequency, may be different for different frequency bands. The notch frequency may be set based on the difference frequency for the frequency band for which the TX leakage canceller is used.

The TX leakage canceller described herein may be implemented on an IC, an analog IC, an RFIC, a mixed-signal IC, an application specific integrated circuit (ASIC), a printed circuit board (PCB), an electronics device, etc. The TX leakage canceller may also be fabricated with various IC process technologies such as complementary metal oxide semiconductor (CMOS), N-channel MOS (NMOS), P-channel MOS (PMOS), bipolar junction transistor (BJT), bipolar-CMOS (BiCMOS), silicon germanium (SiGe), gallium arsenide (GaAs), etc.

An apparatus implementing the TX leakage canceller described herein may be a stand-alone device or may be part of a larger device. A device may be (i) a stand-alone IC, (ii) a set of one or more ICs that may include memory ICs for storing data and/or instructions, (iii) an RFIC such as an RF receiver (RFR) or an RF transmitter/receiver (RTR), (iv) an ASIC such as a mobile station modem (MSM), (v) a module that may be embedded within other devices, (vi) a receiver, cellular phone, wireless device, handset, or mobile unit, (vii) etc.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. An apparatus comprising:
a downconverter to downconvert at a receive frequency an amplified signal based on an input signal and provide a downconverted signal;
a notch filter to filter at a frequency different than the receive frequency the downconverted signal and provide a filtered signal;
an upconverter to upconvert the filtered signal and provide a feedback signal; and
a summer to cancel an undesired signal in the input signal based on the feedback signal.

2. The apparatus of claim 1, further comprising:
a low noise amplifier (LNA) to amplify a receiver input signal and provide the amplified signal, and the feedback signal being subtracted at an input of the LNA.

3. The apparatus of claim 1, further comprising:
a low noise amplifier (LNA) to amplify a receiver input signal and provide a first amplified signal; and
a transconductance amplifier to amplify the first amplified signal and provide a second amplified signal, the amplified signal being obtained based on the second amplified signal, and the feedback signal being subtracted at an input of the LNA or an output of the LNA.

4. The apparatus of claim 1, the downconverter downconverting the amplified signal with a first local oscillator (LO) signal at a transmit frequency and providing the downconverted signal, and the upconverter upconverting the filtered signal with a second LO signal at the transmit frequency and providing the feedback signal.

5. The apparatus of claim 1, the downconverter comprising:
a first mixer to downconvert the amplified signal with an inphase local oscillator (LO) signal and provide an inphase downconverted signal, and
a second mixer to downconvert the amplified signal with a quadrature LO signal and provide a quadrature downconverted signal.

6. The apparatus of claim 5, the notch filter comprising:
a first section to filter the inphase downconverted signal and provide an inphase filtered signal, and
a second section to filter the quadrature downconverted signal and provide a quadrature filtered signal.

7. The apparatus of claim 6, the notch filter further comprising:
a first capacitor to couple a first intermediate signal from the first section to the second section, and
a second capacitor to couple a second intermediate signal from the second section to the first section.

8. The apparatus of claim 6, the upconverter comprising:
a third mixer to upconvert the inphase filtered signal with the inphase LO signal,
a fourth mixer to upconvert the quadrature filtered signal with the quadrature LO signal, and
another summer to sum outputs of the third and fourth mixers and provide the feedback signal.

9. The apparatus of claim 1, the undesired signal comprising a transmit (TX) leakage signal from a transmitter, and the notch filter passing the TX leakage signal.

10. The apparatus of claim 1, the notch filter attenuating a jammer and a desired signal in the input signal.

11. The apparatus of claim 1, the notch filter having a passband equal to or larger than a bandwidth of the undesired signal and providing a predetermined amount of attenuation of a desired signal in the input signal.

12. The apparatus of claim 1, further comprising:
a gm-C circuit implementing the notch filter and comprising a plurality of transconductance amplifiers, a plurality of resistors, and a plurality of capacitors having values determined based on a bandwidth and a notch frequency of the notch filter.

13. The apparatus of claim 1, further comprising:
an active-RC circuit implementing the notch filter and comprising a plurality of operational amplifiers, a plurality of resistors, and a plurality of capacitors having values determined based on a bandwidth and a notch frequency of the notch filter.

14. The apparatus of claim 1, the notch filter comprising a complex notch filter having a notch only at positive frequency or negative frequency.

15. The apparatus of claim 1, the notch filter having a notch at a frequency determined by a difference between the receive frequency and a transmit frequency.

16. The apparatus of claim 1, the notch filter having a notch at a frequency of a jammer in the input signal.

17. The apparatus of claim 1, wherein the downconverter couples to the notch filter, and the notch filter couples to the upconverter, and the upconverter couples to the summer.

18. An integrated circuit comprising:
a downconverter to downconvert at a receive frequency an amplified signal based on an input signal and provide a downconverted signal;
a notch filter to filter at a frequency different than the receive frequency the downconverted signal and provide a filtered signal;
an upconverter to upconvert the filtered signal and provide a feedback signal; and
a summer to cancel an undesired signal in the input signal based on the feedback signal.

19. The integrated circuit of claim 18, further comprising:
a low noise amplifier (LNA) to amplify a receiver input signal and provide the amplified signal, and the feedback signal being subtracted at an input of the LNA.

20. The integrated circuit of claim 18, the downconverter downconverting the amplified signal with a first local oscillator (LO) signal at a transmit frequency and providing the downconverted signal, and the upconverter upconverting the filtered signal with a second LO signal at the transmit frequency and providing the feedback signal.

21. The integrated circuit of claim 18, the notch filter passing the undesired signal and attenuating a jammer and a desired signal in the input signal.

22. A wireless device comprising:
a receiver to process a receiver input signal and provide a canceller input signal; and
a canceller to downconvert at a receive frequency an amplified signal based on the canceller input signal to obtain a downconverted signal, to filter at a frequency different than the receive frequency the downconverted signal with a notch filter to obtain a filtered signal, to upconvert the filtered signal to obtain a feedback signal, and to cancel an undesired signal in the receiver input signal based on the feedback signal.

23. The wireless device of claim 22, the notch filter passing the undesired signal and attenuating a jammer and a desired signal in the input signal.

24. A method comprising:
downconverting at a receive frequency an amplified signal based on an input signal to obtain a downconverted signal;

filtering at a frequency different than the receive frequency the downconverted signal with a notch filter to obtain a filtered signal;

upconverting the filtered signal to obtain a feedback signal; and canceling an undesired signal in the input signal based on the feedback signal.

25. The method of claim 24, the downconverting the amplified signal comprising downconverting the input signal with a first local oscillator (LO) signal at a transmit frequency, and the upconverting the filtered signal comprising upconverting the filtered signal with a second LO signal at the transmit frequency.

26. The method of claim 24, further comprising:

amplifying a receiver input signal to obtain the amplified signal; and subtracting the feedback signal from the receiver input signal to cancel the undesired signal in the input signal.

27. The method of claim 24, the filtering the downconverted signal with the notch filter comprising:

passing the undesired signal component in the input signal, and attenuating a jammer and a desired signal in the input signal.

28. An apparatus comprising:

means for downconverting at a receive frequency an amplified signal based on an input signal to obtain a downconverted signal;

means for filtering at a frequency different than the receive frequency the downconverted signal with a notch filter to obtain a filtered signal;

means for upconverting the filtered signal to obtain a feedback signal; and means for canceling an undesired signal in the input signal based on the feedback signal.

29. The apparatus of claim 28, the means for downconverting the amplified signal comprising means for downconverting the amplified signal with a first local oscillator (LO) signal at a transmit frequency, and the means for upconverting the filtered signal comprising means for upconverting the filtered signal with a second LO signal at the transmit frequency.

30. The apparatus of claim 28, further comprising:

means for amplifying a receiver input signal to obtain the amplified signal; and means for subtracting the feedback signal from the receiver input signal to cancel the undesired signal in the input signal.

31. The apparatus of claim 28, the means for filtering the downconverted signal with the notch filter comprising:

means for passing the undesired signal component in the input signal, and means for attenuating a jammer and a desired signal in the input signal.

* * * * *